(12) United States Patent
Rahn et al.

(10) Patent No.: US 11,470,075 B2
(45) Date of Patent: Oct. 11, 2022

(54) SYSTEMS AND METHODS FOR PROVISIONING NETWORK DEVICES

(71) Applicant: Arista Networks, Inc., Santa Clara, CA (US)

(72) Inventors: Ethan Rahn, Agoura Hills, CA (US); Ritesh Kumar Sinha, Bangalore (IN); Andre Pech, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 87 days.

(21) Appl. No.: 16/824,380

(22) Filed: Mar. 19, 2020

(65) Prior Publication Data

US 2021/0297409 A1  Sep. 23, 2021

(51) Int. Cl.
*H04L 9/40* (2022.01)
*H04L 61/5014* (2022.01)
*H04L 69/167* (2022.01)

(52) U.S. Cl.
CPC ...... *H04L 63/0823* (2013.01); *H04L 61/5014* (2022.05); *H04L 63/0428* (2013.01); *H04L 63/166* (2013.01); *H04L 69/167* (2013.01)

(58) Field of Classification Search
CPC ............. H04L 63/0823; H04L 61/2015; H04L 63/0428; H04L 63/166; H04L 69/167
See application file for complete search history.

(56) References Cited

U.S. PATENT DOCUMENTS

| | | | |
|---|---|---|---|
| 9,230,109 B2 | 1/2016 | Wooten | |
| 9,501,801 B2 | 11/2016 | Wong et al. | |
| 9,953,143 B2 | 4/2018 | Yee et al. | |
| 10,735,190 B1 | 8/2020 | Khare | |
| 2003/0037244 A1 | 2/2003 | Goodman et al. | |
| 2004/0019564 A1 | 1/2004 | Goldthwaite et al. | |
| 2007/0010311 A1 | 1/2007 | Irwin, Jr. et al. | |
| 2013/0211874 A1 | 8/2013 | Wu et al. | |

(Continued)

OTHER PUBLICATIONS

Watsen et al. Secure Zero Touch Provisioning (SZTP) RFC 8572 IETF Apr. 2019 (Year: 2019).*

(Continued)

*Primary Examiner* — Chris Parry
*Assistant Examiner* — Steven C Nguyen
(74) *Attorney, Agent, or Firm* — Fountainhead Law Group P.C.

(57) ABSTRACT

Network devices are securely provisioned through authenticated ZTP servers. In some approaches, a storage device local to the network device includes information for connecting with and authenticating a local or remote ZTP server. This information may include a root of trust to use when connecting with a designated ZTP server. The ZTP server may be identified using either a dynamic host configuration protocol (DHCP) server or a network address specified in the local memory storage. In an approach, the local memory storage is a removable USB flash memory device inserted into the network device when the device is booted up. In another approach, the ZTP authentication information is stored within memory integrated within the network device. Once a ZTP server is connected to the network device, a secure connection may be established such as a secure transport layer session (TLS) utilizing the root of trust.

30 Claims, 6 Drawing Sheets

(56) References Cited

U.S. PATENT DOCUMENTS

| | | | |
|---|---|---|---|
| 2014/0380310 A1* | 12/2014 | Wei | G06F 9/45558 |
| | | | 718/1 |
| 2016/0241701 A1* | 8/2016 | Gray | H04L 41/0806 |
| 2017/0039352 A1 | 2/2017 | Volkening et al. | |
| 2017/0075699 A1 | 3/2017 | Narayanan et al. | |
| 2017/0155513 A1 | 6/2017 | Acar et al. | |
| 2017/0302459 A1 | 10/2017 | Fenner et al. | |
| 2019/0163597 A1 | 5/2019 | Shibamura | |
| 2019/0182044 A1 | 6/2019 | Mullen et al. | |
| 2019/0379612 A1 | 12/2019 | Tiwary | |
| 2020/0162318 A1 | 5/2020 | Patil et al. | |
| 2020/0186365 A1* | 6/2020 | Kumar | H04L 9/3247 |
| 2021/0120412 A1* | 4/2021 | Bruner | H04W 4/50 |
| 2021/0152353 A1 | 5/2021 | Canillas et al. | |

OTHER PUBLICATIONS

U.S. Appl. No. 16/824,381, filed Mar. 19, 2020, Ethan Rahn.
U.S. Appl. No. 16/824,382, filed Mar. 19, 2020, Ethan Rahn.

\* cited by examiner

SYSTEMS AND METHODS FOR PROVISIONING NETWORK DEVICES

BACKGROUND

The present disclosure relates to automatically and securely provisioning network devices over a network.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
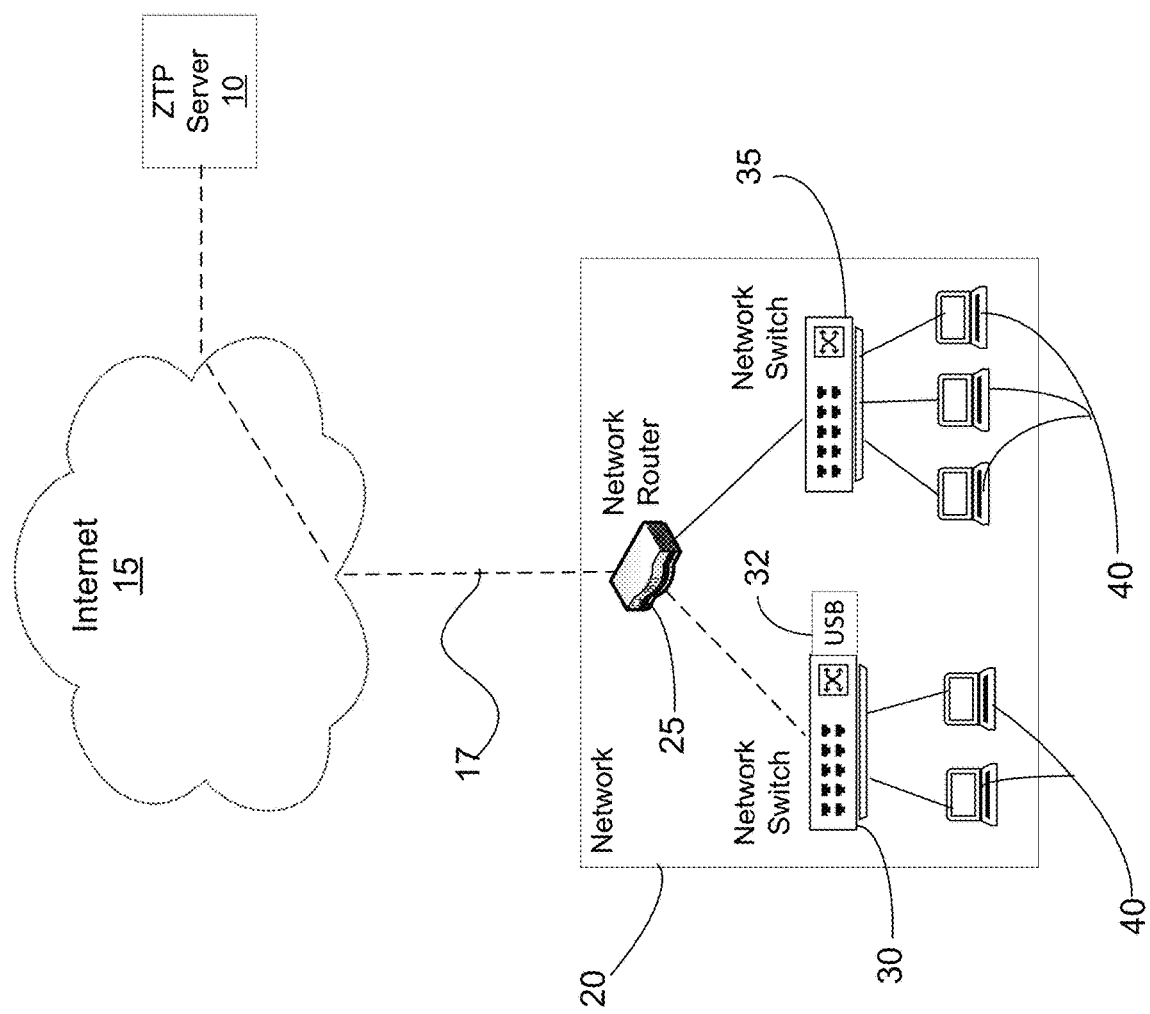
FIG. 1 shows an illustrative network topology of a system for provisioning a switch, in accordance with some embodiments of the disclosure.

In some computer networks, newly installed or existing network devices (e.g., switches, routers, etc.) require initial and/or periodic provisioning with updated configurations and software. In some cases, large numbers of such devices must be configured. Maintaining the security of such devices can be critical to maintaining the integrity of the network and preventing the network from being compromised by external threats. In some cases, each of these devices are provisioned by an onsite technician who installs and/or updates the configurations and software of each device individually. This process can require substantial amounts of time and costs, particularly if there are a large number of devices that require provisioning.

In some networks, a zero touch provisioning (ZTP) system is utilized in which a local secure ZTP server is connected to the network of devices that need provisioning. Each of the devices will be shipped and configured to establish a connection with a local ZTP server when initially turned on. After establishing the connection, the ZTP server will provision the connected device. The local ZTP server and the connected devices are typically firewalled from other networks, servers, and devices during the provisioning/updating process to prevent potential external interference with the process. Exposing a traditional ZTP system to an external untrusted network, for example, could potentially allow a malicious entity to impersonate the correct ZTP server. Thus, traditional ZTP provisioning may still require an onsite technician to install, manage, and/or monitor the local ZTP server during the provisioning process.

Methods and systems are described herein to address these problems and allow network devices to be securely provisioned through local and remote authenticated ZTP servers. In some approaches, a storage device local to the respective network device includes information for connecting with and authenticating a remote ZTP server. This information may include a root of trust to use when connecting with a designated ZTP server. The ZTP server may be identified using either a dynamic host configuration protocol (DHCP) server or a network address specified in the local memory storage. In an approach, the local memory storage is a removable USB flash memory device inserted into the network device when the device is booted up. In another approach, the ZTP authentication information is stored within memory integrated within the network device. Once a ZTP server is connected to the network device, a secure connection may be established such as a secure transport layer session (TLS) utilizing the root of trust.

In some approaches, the switch attempts to connect to a remote provisioning helper service (e.g., a cloud provisioning helper service located at a trusted server). The service may communicate with the device in order to authenticate the device such as by confirming a device serial number and/or using root of trust certificates and private/public encryption keys (e.g., a public key infrastructure (PKI) procedure). Serial number confirmation may be accomplished such as further described in the U.S. patent application 16/824,382, now U.S. Patent Application Publication 2021/0297259. The service may be part of or further direct the device to a separate trusted ZTP server or a remote site (e.g., Arista's CloudVision Portal (CVP) platform) before proceeding with secure provisioning. For example, once the device is authenticated by the service, the service may provide a certificate with which to further securely communicate with a local or remote ZTP server.

In an approach, different methods of provisioning the device are attempted in a sequential order such as based upon the level of security provided by each of the methods. For example, an approach first attempts to find a connected USB storage device as described above and, if no corresponding USB is discovered, the device then attempts to connect with a provisioning helper service as described and, if no such service can be connected with, the device attempts to connect with a local ZTP server directly using a specified IP address and, if that is unsuccessful, then attempt to connect to a ZTP server by relying on an available DHCP/DNS servers.

FIG. 1 shows an illustrative network topology of a system for provisioning a switch, in accordance with some embodiments of the disclosure. A network 20 includes multiple switches including a switch 35 and a switch 30 being provisioned according to some embodiments. Switches 30 and 35 may be connected to multiple devices 40 and to each other through network 20. Switch 30 may connect via a router 25 and the internet 15 to a remote ZTP server 10 via a network connection 17. During a provisioning process (e.g., during an initial setup of a newly added switch), a portable memory device 32 (e.g., a USB memory flash drive) is directly interfaced with (e.g., inserted into) switch 30. A network address for connecting to ZTP server 10 through the internet 15 may be programmed into memory device 32 and made accessible to network switch 30. Further, a root encryption certificate (e.g., an x509 certificate) may also have been programmed into memory device 32 where it may be accessed by network switch 30 to authenticate ZTP server 10. In some embodiments, the root encryption certificate may be signed by a trusted certification authority (CA) and include a public key with which to encrypt/decrypt data received/transmitted between the switch 30 and ZTP server 10. Software operating on switch 30 may perform an authentication process utilizing the certificate. For example, the software may request that the ZTP server 10 send an encrypted message which can be decrypted using the root encryption certificate. Once the authentication process successfully authenticates the ZTP server 10, the software may be programmed to trust and permit the ZTP server 10 to automatically provision switch 30 with new software and/or configurations.

Figure 2B:
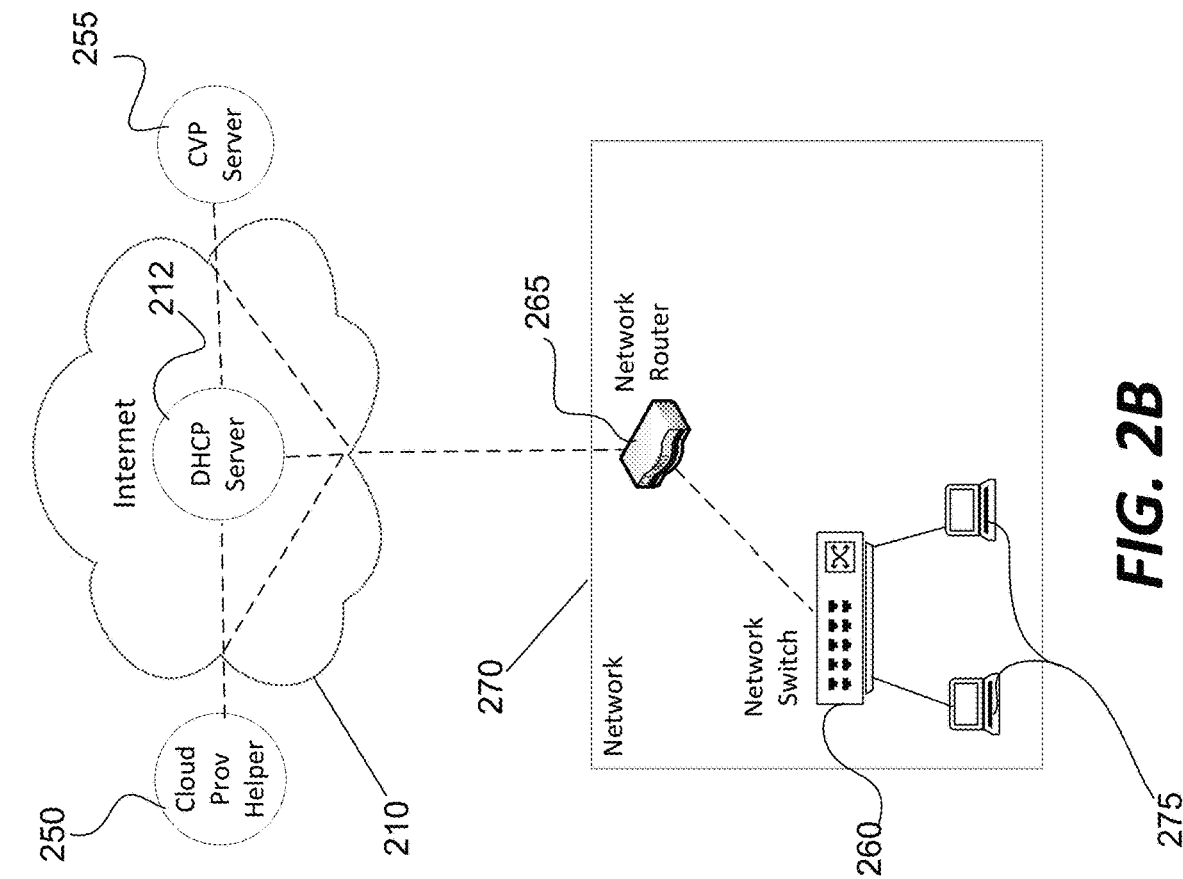
FIG. 2B shows an illustrative network topology of a system for provisioning a switch, in accordance with some embodiments of the disclosure.
Figure 2A:
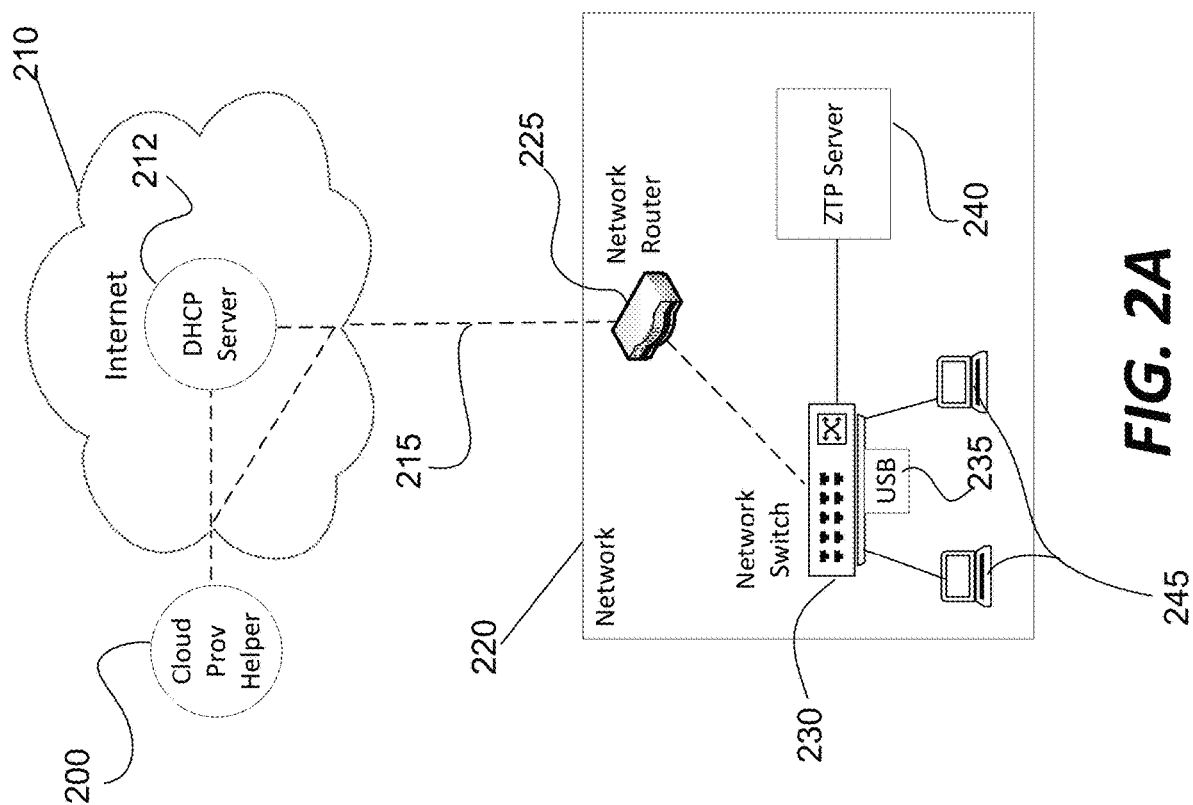
FIG. 2A shows an illustrative network topology of a system for provisioning a switch, in accordance with some embodiments of the disclosure.

FIG. 2A shows an illustrative network topology of a system for provisioning a switch, in accordance with some embodiments of the disclosure. A network 220 includes a network switch 230, devices 245 (e.g., computers, printers, servers, etc.) connected to the network through switch 230, and a local secure ZTP server 240 accessible to the switch 230. Network 220 is connected to the internet 210 through a router 225 and a network connection 215. A cloud portal server 200 accessible via the internet is configured to provide a cloud provisioning helper service to switch 230. Server 200 and its helper service may be associated with a trusted origin (e.g., the switch manufacturer). A portable memory device 235 may configured with information (e.g., an IP address) for connecting to cloud portal server 200 and/or to the local ZTP server 240.

After connecting with server 200, server 200 may receive a request from software operating on the switch 230 to authenticate the origin of the switch 230 such as by confirming the device serial number embedded in memory of switch 230 and/or using a trusted platform module (TPM) installed in the device. Systems and methods for such authentication are described, for example, in related applications U.S. patent application Ser. No. 16/824,381, now U.S. Pat. No. 11,178,249 and U.S. patent application Ser. No. 16/824382, now U.S. Patent Application Publication 2021/0297259, filed concurrently with the present application, the entire contents of each of which are herein incorporated by reference. In some embodiments, an orders management system may track a serial number of a device with a particular tenant upon distribution of the device. Once deployed in a network, a multi-tenant cloud provisioning service/helper may be used to authenticate and/or provision the switch according to the particular tenant associated with the device through the orders management system. In some embodiments, a trusted platform module (TPM) may be integrated into the device and, upon initialization, the device is configured to check for the presence of a TPM. In some embodiments, the multi-tenant cloud provisioning service and/or the software installed on the device accesses a CA encryption key or signed certificate (e.g., using PKI) installed on the device or in a removable memory device (e.g., USB drive), and uses the CA signature/key, the public EK, and the TPM to confirm that the device originated from the expected manufacturer.

After being authenticated, switch 230 programming may use information (e.g., IP addresses) from the portable memory device 235 to perform provisioning with the ZTP server 240 and/or cloud portal server 200. In some embodiments, switch 230 may fail to recognize or connect with a memory device such as device 235, after which switch 230 may then attempt to connect to server 200, secure ZTP server 240, and/or a remote ZTP server such as by establishing a connection utilizing a DHCP server 212 or using default IP addresses programmed into the memory (e.g., flash memory) or software initially installed in switch 230.

FIG. 2B shows an illustrative network topology of a system for provisioning a switch, in accordance with some embodiments of the disclosure. A network 270 includes a network switch 260 and devices 275 (e.g., computers, printers, servers, etc.) connected through the switch 260, which are connected to the internet 210 through router 265. A cloud provisioning helper server 250 and a provisioning server 255 are accessible via the internet 210. Network switch 260 may be programmed to connect with the helper server 250 directly (e.g., via embedded IP addresses) or through a DHCP server 212. The helper server 250 may be associated with a trusted source (e.g., switch manufacturer, Arista's CloudVision Portal (CVP) platform) and be programmed to authenticate the switch 260 (such as previously described) and then direct the switch 260 to the provisioning server 255 for switch provisioning.

The switch 260 may be programmed for provisioning by first determining whether an attached portable memory device (e.g., device 235) is present such as described in FIG. 2A and, if not available, then attempt to connect with a cloud portal server 250. Provisioning server 255 may provide a dedicated service for provisioning network devices automatically in a secure manner. Server 255 and cloud portal server 250 may be multi-tenant servers configured to identify, authenticate, and/or provision devices with different configurations for different tenants automatically.

Figure 3:
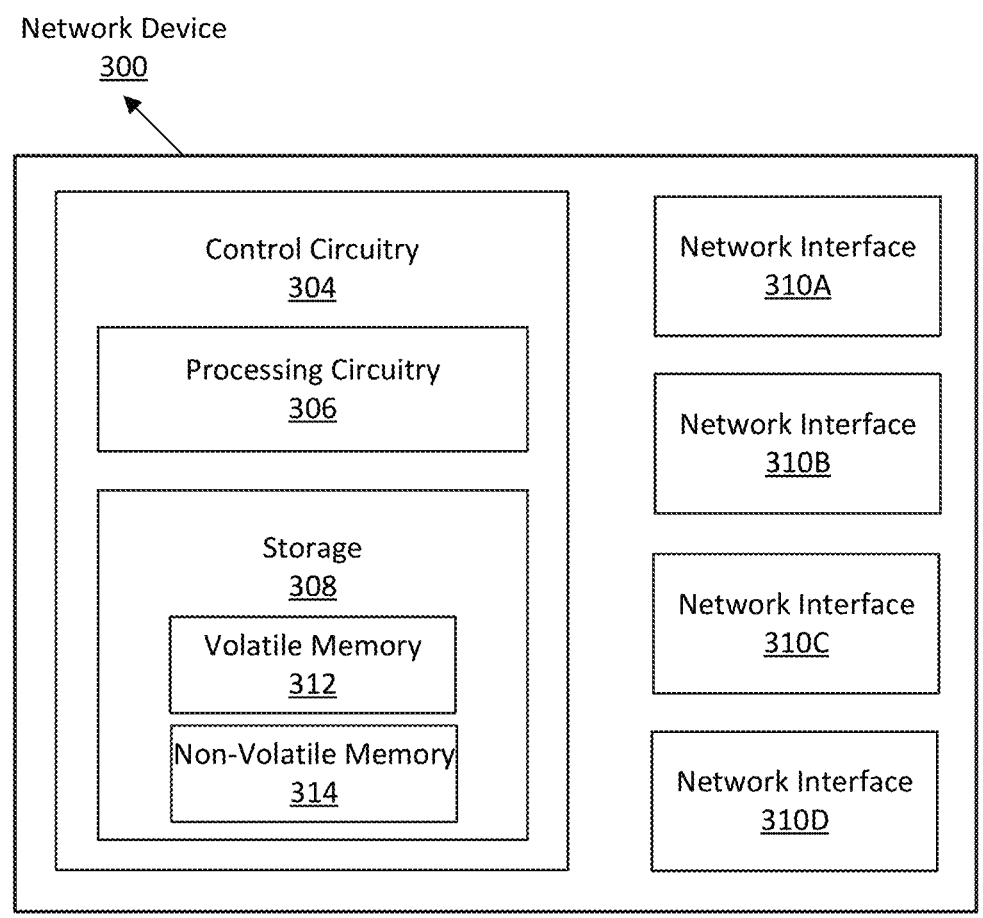
FIG. 3 shows a diagram of an illustrative network device in a provisioning system, in accordance with some embodiments of the disclosure.

FIG. 3 shows a diagram of an illustrative network device 300 in a provisioning system, in accordance with some embodiments of the disclosure. Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions for performing operational, communication, and provisioning functions in devices such as described in FIGS. 1 and 2A-2B. For example, control circuitry 304 may be integrated into network switch 30 of FIG. 1 and network switch 30 may process communications with ZTP server 10 via network interface 310A-C, store the connection information received from memory device 235 (e.g., USB Flash memory) in storage 308 (i.e., volatile RAM 312), and be programmed with startup/initializing software instructions and parameters for performing processing described in FIGS. 4-6 in volatile RAM 312 and/or non-volatile RAM 314.

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard drives, optical drives, solid state devices, quantum storage devices, or any other suitable fixed or removable storage devices, and/or any combination of the same. The circuitry described herein may execute instructions included in software running on one or more general purpose or specialized processors. Multiple circuits may be provided to handle simultaneous processing functions. Further, other devices described herein (e.g., ZTP server 10) may include the processing and storage components of device 300 and/or variations thereof.

Figure 4:
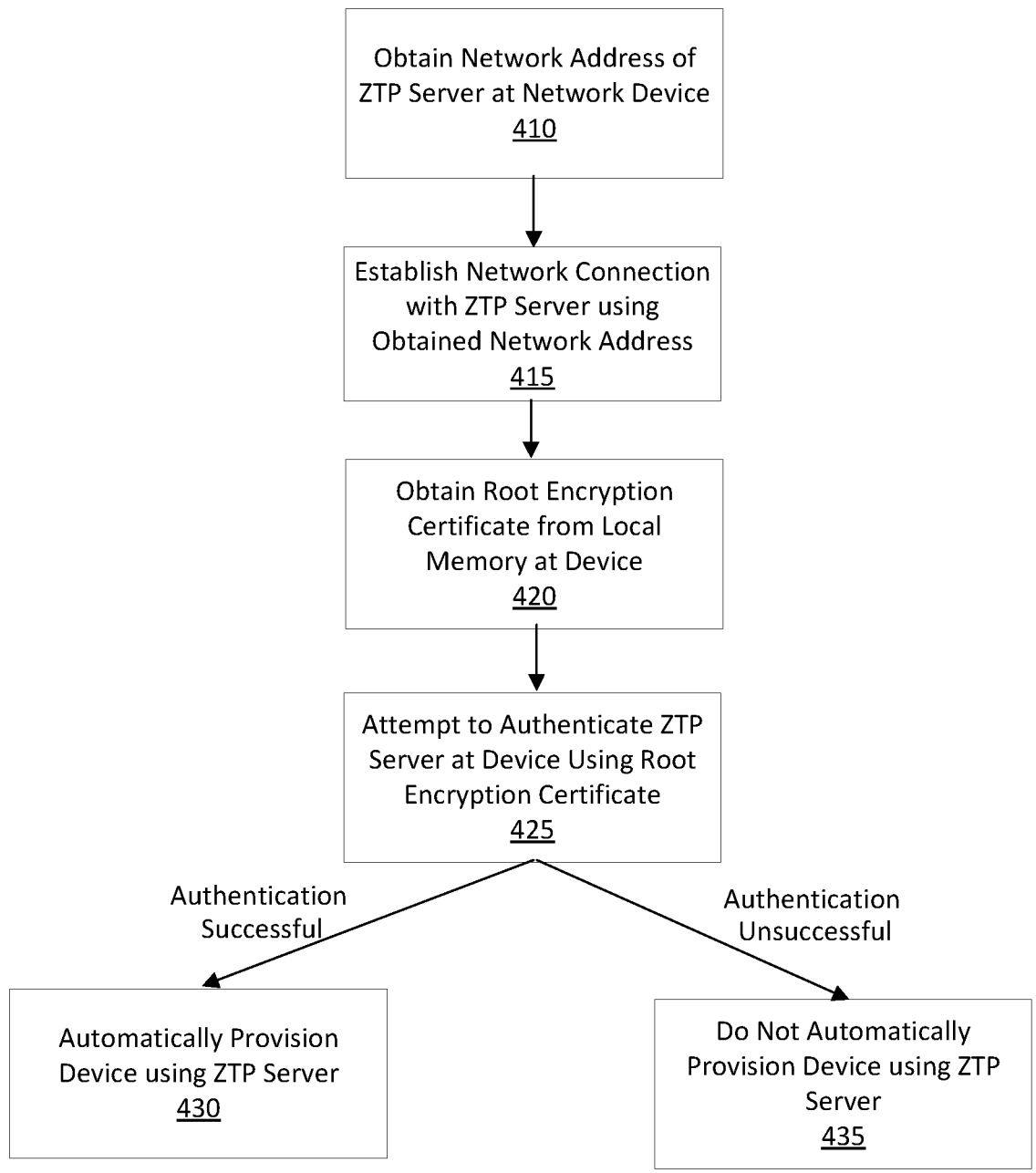
FIG. 4 is a flowchart of an illustrative process for provisioning a network device using a ZTP server, in accordance with some embodiments of the present disclosure.

FIG. 4 is a flowchart of an illustrative process for provisioning a network device using a ZTP server, in accordance with some embodiments of the present disclosure. At block 410, a network device obtains information (e.g., a network address) for connecting to a provisioning server (e.g., a ZTP server). In some embodiments, the information is obtained from a portable memory device (e.g., USB device 32 of FIG. 1) inserted into the network device, from memory (e.g., flash memory) in the network device, or from initialization/operating software installed on the device and can include information for connecting to a ZTP server. At block 415, the network device uses the connection information to connect to a ZTP server, which may be remote or local to a network to which the network device is connected. At block 420, an encryption certificate (e.g., a root x509 certificate) or similar security token is obtained for purposes of authenticating the ZTP server. At block 425, the network switch attempts to authenticate the ZTP server using the encryption certificate. This may be performed, for example, by software operating the switch requesting that the ZTP server decrypt/encrypt and confirm a message encrypted/decrypted by the switch software using the encryption certificate.

If authentication is successful (e.g., the message was successfully decrypted/encrypted by the ZTP server), the network device may further request and accept provisioning from the ZTP server at block 430. If authentication is not successful, the network device may block or suspend provisioning at block 435. In some embodiments, the authentication and provisioning process is performed during initialization of the network device. Initialization may be started when a device is first turned on or is reset by an operator. In some embodiments, the network device may be a switch, router, hub, or other network device being provisioned for use in a network.

Figure 5:
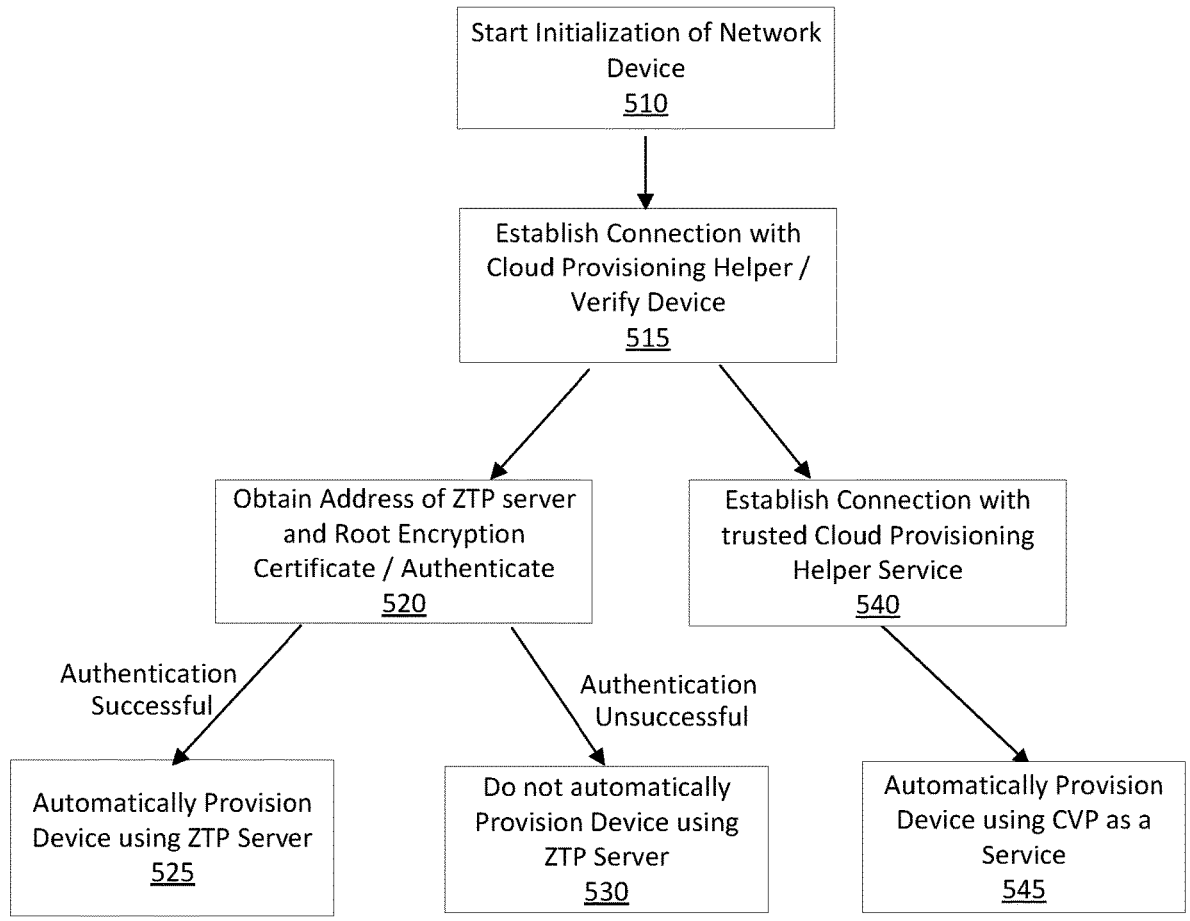
FIG. 5 is a flowchart of an illustrative process utilizing a cloud service for provisioning a network device, in accordance with some embodiments of the present disclosure.

FIG. 5 is a flowchart of an illustrative process utilizing a cloud service for provisioning a network device, in accordance with some embodiments of the present disclosure. An initialization of a network device begins at block 510. In some embodiments, the device initializes by attempting to establish a connection with a cloud provisioning helper server at block 515, which may then identify/verify the device such as described herein. The cloud provisioning helper server may direct the network device to a ZTP server at block 520. The network device may then attempt to authenticate the ZTP server using an encryption certificate installed on the device or provided by the helper server such as described herein. If the ZTP server is not authenticated, the network device may block or suspend provisioning with the ZTP server at block 530. Otherwise, if authenticated, the network device continues with automatic provisioning using the ZTP server at block 525.

As an alternative to using a ZTP server, the cloud provisioning helper server 515 may direct the network device to a trusted cloud provisioning server (e.g., via the internet) at block 540. After establishing a connection with the provisioning server, the network device may proceed with being provisioned by the provisioning server at block 545.

Figure 6:
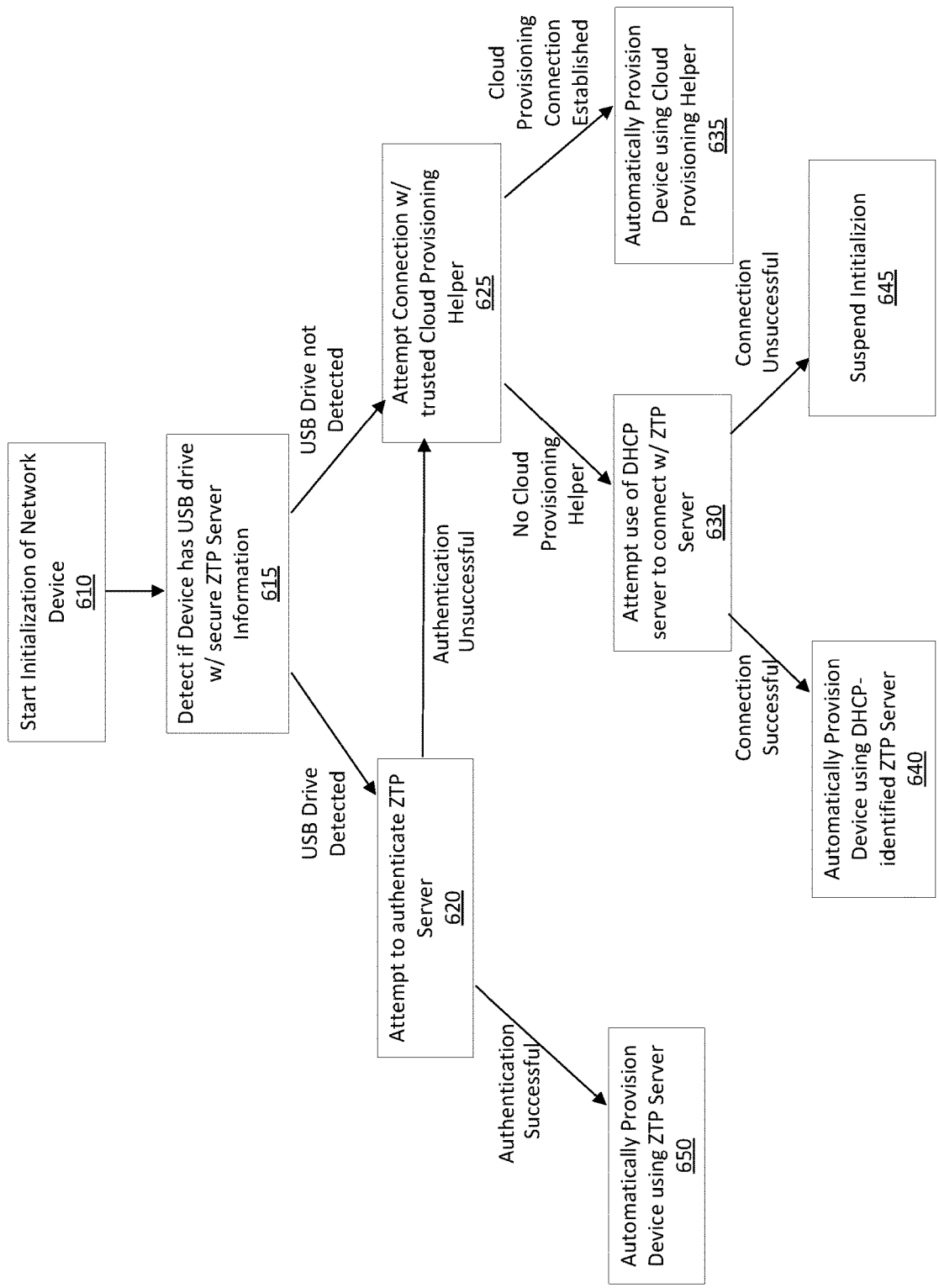
FIG. 6 is a flowchart of an illustrative process utilizing multiple alternative provisioning methods, in accordance with some embodiments of the present disclosure.

FIG. 6 is a flowchart of an illustrative process utilizing multiple alternative provisioning methods, in accordance with some embodiments of the present disclosure. Initialization of the network device begins at block 610 such as in response to an initial turning on or resetting of the network device. During initialization of the network device, at block 615, the network device automatically determines if a portable memory device (e.g., USB memory stick) is inserted and is programmed with information for connecting to and/or authenticating a secure ZTP server such as previously described. If a portable memory device is available with secure ZTP connection information, the device will attempt to authenticate the designated ZTP server at block 620 and, if authenticated, will use the ZTP server to automatically provision the device at block 650.

If no such information from a portable memory device can be successfully obtained, the network device may subsequently attempt to connect to a trusted cloud provisioning helper server at block 625 using a known address programmed into the software or memory of the network device. If a provisioning helper is available, the provisioning helper server will automatically provision the device at block 635.

If no provisioning helper server is available, the network device may then attempt to redirect provisioning by utilizing DHCP/DNS servers to connect with a local or remote ZTP server (e.g., over the internet) at block 630. If the network device successfully connects to a ZTP server at block 630, the network device may then attempt at block 640 to authenticate the ZTP server such as by using a public key infrastructure (PKI) procedure established between the network device and ZTP server. Additional authentication procedures may be implemented including IEEE 802.1x. In response to a failed authentication, the network device may suspend initialization or further redirect provisioning at block 645.

In some embodiments, the network device being provisioned is an element of a tenant network (e.g., network 20) and the provisioning process is performed without intervention of the tenant network. For example, the network device and a ZTP server, provisioning helper, and/or DHCP/DNS servers used to provision the device may do so without requiring that elements of the tenant network instigate or control the provisioning process.

The processes of FIGS. 4, 5, and 6 described above are intended to be illustrative and not limiting. More generally, the above disclosure is meant to be illustrative and not limiting. Only the claims that follow are meant to set bounds as to what the claimed embodiments include. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry such as the processing circuitry of FIG. 3 described above.

What is claimed is:

1. A method executed by a network device for, the method comprising:
   determining whether a universal serial bus (USB) device is inserted into the network device;
   in response to determining the USB device is inserted, obtaining a network address of a provisioning server and an encryption certificate from the USB device;
   in response to determining the USB device is not inserted, determining whether a cloud services server can be connected to;
   in response to determining the cloud services server can be connected to, obtaining the network address of the provisioning server and the encryption certificate from the cloud services server;
   in response to determining the cloud services server cannot be connected to, obtaining the network address of the provisioning server from a domain host configuration protocol (DHCP) server;
   establishing a network connection with the provisioning server using the network address;
   in response to obtaining the encryption certificate from at least one of the USB device and the cloud services server, authenticating the provisioning server using the encryption certificate; and
   provisioning the network device with a configuration received from the provisioning server.

2. The method of claim 1 wherein the cloud services server identifies the network device through a unique identifier obtained from the network device and, based upon identifying the network device, selecting the network address of the provisioning server among a plurality of provisioning server network addresses.

3. The method of claim 1 wherein the network device is a network element of a tenant network and the provisioning of the network device is performed without requiring intervention of the tenant network.

4. The method of claim 3 wherein the provisioning server operates independently of the tenant network.

5. The method of claim 1 wherein the cloud services server provides the encryption certificate in response to identifying the network device.

6. The method of claim 1 further comprising:
   in response to obtaining the network address of the provisioning server from the DHCP server, authenticating the provisioning server using at least one of a public key infrastructure and IEEE 802.1x procedure.

7. The method of claim 1 wherein authenticating the provisioning server comprises:
   sending an encrypted message to the provisioning server;
   requesting the provisioning server to decrypt the encrypted message;
   receiving a decrypted message from the provisioning server; and
   confirming the received decrypted message.

8. The method of claim 1 wherein authenticating the provisioning server comprises:
   sending a message to the provisioning server;
   requesting the provisioning server to encrypt the message;
   receiving an encrypted message from the provisioning server; and
   confirming the received encrypted message.

9. The method of claim 1 wherein the encryption certificate is a root x509 certificate.

10. The method of claim 1 wherein the USB device comprises flash memory.

11. A system comprising:
    a provisioning server; and
    a network device programmed and configured to be provisioned by the provisioning server, the network device comprising a processor and a memory programmed and configured to:
    determine whether a universal serial bus (USB) device is inserted into the network device;
    in response to determining the USB device is inserted, obtain a network address of the provisioning server and an encryption certificate from the USB device;
    in response to determining the USB device is not inserted, determine whether a cloud services server can be connected to;
    in response to determining the cloud services server can be connected to, obtain the network address of the provisioning server and the encryption certificate from the cloud services server;
    in response to determining the cloud services server cannot be connected to, obtain the network address of the provisioning server from a domain host configuration protocol (DHCP) server;
    establish a network connection with the provisioning server using the network address;
    in response to obtaining the encryption certificate from at least one of the USB device and the cloud services server, authenticate the provisioning server using the encryption certificate; and
    provision the network device with a configuration received from the provisioning server.

12. The system of claim 11 wherein the cloud services server is programmed and configured to identify the network device through a unique identifier obtained from the network device and, based upon identifying the network device, select the obtained network address of the provisioning server among a plurality of provisioning server network addresses.

13. The system of claim 11 wherein the network device is a network element of a tenant network and the provisioning of the network device is performed without requiring intervention of the tenant network.

14. The system of claim 13 wherein the provisioning server operates independently of the tenant network.

15. The system of claim 11 wherein the cloud services server provides the encryption certificate in response to identifying the network device.

16. The system of claim 11 wherein in response to obtaining the network address of the provisioning server from the DHCP server, authenticating the provisioning server using at least one of a public key infrastructure and IEEE 802.1x procedure.

17. The system of claim 11 wherein authenticating the provisioning server comprises:
    sending an encrypted message to the provisioning server;
    requesting the provisioning server to decrypt the encrypted message;
    receiving a decrypted message from the provisioning server; and
    confirming the received decrypted message.

18. The system of claim 11 wherein authenticating the provisioning server comprises:
    sending a message to the provisioning server;
    requesting the provisioning server to encrypt the message;
    receiving an encrypted message from the provisioning server; and
    confirming the received encrypted message.

19. The system of claim 11 wherein the encryption certificate is a root x509 certificate.

20. The system of claim 11 wherein the USB device comprises flash memory.

21. One or more non-transitory computer-readable media storing instructions, which when executed by one or more processors of a network device cause:

determining whether a universal serial bus (USB) device is inserted into the network device;

in response to determining the USB device is inserted, obtaining a network address of a provisioning server and an encryption certificate from the USB device;

in response to determining the USB device is not inserted, determining whether a cloud services server can be connected to;

in response to determining the cloud services server can be connected to, obtaining the network address of the provisioning server and the encryption certificate from the cloud services server;

in response to determining the cloud services server cannot be connected to, obtaining the network address of the provisioning server from a domain host configuration protocol (DHCP) server;

establishing a network connection with the provisioning server using the network address;

in response to obtaining the encryption certificate from at least one of the USB device and the cloud services server, authenticating the provisioning server using the encryption certificate; and provisioning the network device with a configuration received from the provisioning server.

22. The one or more non-transitory computer-readable media of claim 21 wherein the cloud services server identifies the network device through a unique identifier obtained from the network device and, based upon identifying the network device, selecting the obtained network address of the provisioning server among a plurality of provisioning server network addresses.

23. The one or more non-transitory computer-readable media of claim 21 wherein the network device is a network element of a tenant network and the provisioning of the network device is performed without requiring intervention of the tenant network.

24. The one or more non-transitory computer-readable media of claim 23 wherein the network provisioning server operates independently of the tenant network.

25. The one or more non-transitory computer-readable media of claim 21 wherein the cloud services server provides the encryption certificate in response to identifying the network device.

26. The one or more non-transitory computer-readable media of claim 21 wherein in response to obtaining the network address of the provisioning server from the DHCP server, authenticating the provisioning server using at least one of a public key infrastructure and IEEE 802.1x procedure.

27. The one or more non-transitory computer-readable media of claim 21 wherein authenticating the provisioning server comprises:

sending an encrypted message to the provisioning server;

requesting the provisioning server to decrypt the encrypted message;

receiving a decrypted message from the provisioning server; and confirming the received decrypted message.

28. The one or more non-transitory computer-readable media of claim 21 wherein authenticating the provisioning server comprises:

sending a message to the provisioning server;

requesting the provisioning server to encrypt the message;

receiving an encrypted message from the provisioning server; and confirming the received encrypted message.

29. The one or more non-transitory computer-readable media of claim 21 wherein the encryption certificate is a root x509 certificate.

30. The one or more non-transitory computer-readable media of claim 21 wherein the USB device comprises flash memory.

\* \* \* \* \*